United States Patent Office 3,376,345
Patented Apr. 2, 1968

3,376,345
PROCESS FOR PREPARING POLY FLUORO ANILINES AND PHENOLS
Harold Crosbie Fielding, Northwich, England, assignor to Imperial Chemical Industries Limited, London, England, a corporation of Great Britain
No Drawing. Filed Sept. 2, 1964, Ser. No. 394,051
Claims priority, application Great Britain, Sept. 19, 1963, 36,912/63
4 Claims. (Cl. 260—577)

This invention relates to a process for making derivatives of fluorochlorobenzenes by replacement of chlorine atoms therein.

It is known that hexafluorobenzene reacts readily with nucleophilic reagents to give perfluorobenzene derivatives. For example, with caustic potash dissolved in tertiary butanol perfluorophenol, $C_6F_5OH$, is formed; likewise, with an alcoholic solution of ammonia or with sodium dissolved in liquid ammonia perfluoroaniline, $C_6F_5NH_2$, is formed.

Fluorochlorobenzenes undergo similar reactions; for example, trifluorotrichlorobenzene, tetrafluorodichlorobenzene and pentafluorochlorobenzenes respectively give difluorotrichlorophenol, $C_6F_2Cl_3OH$, trifluorodichlorophenol, $C_6F_3Cl_2OH$, and tetrafluorochlorophenol $$C_6F_4ClOH$$

when reacted with caustic potash in tertiary butanol. Likewise with alcoholic ammonia the corresponding fluorochloroanilines are formed.

In all these reactions it is fluorine atoms and not chlorine atoms that are detached from the nucleus and replaced by hydroxyl or amino or other groups, and it has not hitherto been found possible to detach chlorine atoms in preference to fluorine atoms.

We have now found that it is possible to detach chlorine atoms from fluorochlorobenzenes and replace them by other groups if the reaction with the nucleophilic reagent is carried out in the presence of salts or oxides of copper.

Thus according to our invention a process for replacing chlorine atoms in fluorochlorobenzenes with hydroxyl, amino or alkyl amino groups comprises heating a fluorochlorobenzene with respectively water, ammonia, or a primary or secondary aliphatic amine, in the presence of a copper salt or oxide.

Water, ammonia, primary and secondary aliphatic amines have in common, so far as concerns the process of the invention, the ability of their molecules to give up a hydrogen atom that combines with a chlorine atom attached to the nucleus of the fluorochlorobenzene and removes it therefrom, the place of the chlorine atom being taken by what remains of the molecule of water, ammonia or amine after it has given up the hydrogen atom. The reaction of the process may thus be represented by the equation $$C_6F_xCl_{6-x} + HQ \rightarrow C_6F_xCl_{5-x}Q + HCl$$

in which $x$ is an integer from 1 to 5, for the examples in which only one chlorine atom is removed from the fluorochlorobenzene. Where more than one chlorine atom is removed a more general equation for the reaction is $$C_6F_xCl_{6-x} + yHQ \rightarrow C_6F_xCl_{6-x-y}Q_y + yHCl$$

wherein $y$ is an integer from 1 to $6-x$. In each equation Q represents OH, $NH_2$ or NHR where R is a lower alkyl group.

The preferred copper salts are the halides particularly cuprous chloride and cupric chloride; the preferred oxide is cuprous oxide.

It is advantageous to carry out the reaction in a liquid medium, for stirring of the reaction mixture is then easier. Also, if the liquid medium can act as a solvent for one or more of the various phases involved in the reaction the latter becomes homogeneous and its progress is encouraged. An example of a liquid medium that merely makes stirring easier is pentane. Examples of solvents are ethanol and ethanol/water mixtures, in which cuprous chloride readily dissolves in the presence of ammonia or amines, dimethylformamide and dimethylacetamide. Water alone can be used as the liquid medium if desired for though it does not act as a solvent for fluorochlorobenzenes it does, in the presence of ammonia and lower aliphatic amines, dissolve cuprous chloride and consequently the reaction system consists of liquid phases rather than liquid and solid phases. When used in this way in reactions according to the process of the invention in which ammonia or primary or secondary aliphatic amines are taking part water does not compete with them for the chlorine of the fluorochlorobenzene but behaves solely as a reaction medium.

Examples of the process are the reactions in the presence of cuprous chloride of pentafluorochlorobenzene with aqueous ammonia, aqueous ethylamine and aqueous methylamine to give respectively pentafluoroaniline, pentafluoromonoethylaniline, and pentafluoromonomethylaniline respectively; the reaction of pentafluorochlorobenzene with cuprous oxide and water to give pentafluorophenol, and the reaction of tetrafluorodichlorobenzene with aqueous ammonia in the presence of cuprous chloride to give a range of fluorochloroanilines.

A convenient proportion of ammonia or amine is from 1 to 6 moles per mole of fluorochlorobenzene.

The reaction temperature is from about 150° C. to 400° C., preferably 200° to 300° C., and the reaction time from 2 to 24 hours. To achieve such temperatures when the liquid reaction medium or solvent consists of ethanol, ethanol/water mixtures or water or other liquids having boiling points below 150° C. it is necessary to carry out the reaction under moderately elevated pressure, for example in an autoclave.

Example 1

Pentafluorochlorobenzene (20 g.), cuprous chloride (2 g.), and 31% aqueous ammonia (120 ml.) were charged to a 200 ml. stirred autoclave. The autoclave was heated for 6 hours at 200° to 220° C. The organic material was extracted from the reaction mixture with ether (3 x 50 ml. portions), and the ether extract washed with water, then dried over anhydrous sodium sulphate. The ether was distilled away, and the fluoroanilines were obtained from the residue by distillation. Pentafluoroaniline (8.4 g.) B.P. 153° C., M.P. 36° C., was identified by its infrared spectrum and its retention time on a gas-chromatography column.

Found: percent C, 41.1; H, 1.5; N, 8.4; F, 48.5; Cl negligible. $C_6F_5NH_2$ requires: percent C, 39.3; H, 1.1; N, 7.7; F, 51.9. Minor products of the reaction were a diamine (N, 16.1%); a chlorofluoroaniline, $C_6F_4Cl.NH_2$ (Cl, 16.9%); and reduced perfluoroanilines e.g. $C_6F_3H_2.NH_2$.

Example 2

Pentafluorochlorobenzene (20 g.), cuprous chloride (2 g.), and 30% aqueous ethylamine (100 ml.) were charged to a 200 ml. stirred autoclave, and heated at 190° to 210° C. for 6 hours. The organic fraction was isolated as in Example 1 and on distillation gave ethyl pentafluoroaniline (10.4 g.), B.P. 110°–115° C. at 120 mm.

Found: percent C, 46.2; H, 3.2; N, 7.3; F, 43.0; Cl negligible. $C_6F_5.NHEt$ requires: percent C, 45.5; H, 2.8; N, 6.6; F, 45.0.

Minor products of the reaction included the chlorofluoroamine, $C_6F_4Cl.NHEt$ (found 15.9% Cl, 6.5% N;

required 15.6% Cl, 6.2% N) and reduced ethylfluoroanilines e.g. $C_6F_3H_2.NHEt$.

Example 3

Pentafluorochlorobenzene (20 g.), water (40 g.) and freshly prepared cuprous oxide (2 g.) were heated together, with stirring, in an autoclave at 370° to 390° C. for 6 hours. The reaction products were filtered, made alkaline to litmus with aqueous KOH, and extracted with ether. This extract, after washing with water and drying, gave on distillation some unchanged $C_6F_5Cl$ (3 g.) and pentafluorobenzene, $C_6F_5H$, B.P. 83° C. (8 g.). The phenolic products were isolated by acidification of the aqueous KOH layer, followed by extraction with ether. Distillation of the ether extract gave a small yield (2.1 g.) of perfluorophenol, $C_6F_5OH$, B.P. 72–73° C. at 48 mm. (reported B.P. 72° at 48 mm.).

Found: percent C, 41.2; H, 1.1; F, 49.9; Cl negligible. $C_6F_5OH$ requires: percent C, 39.1; H, 0.5; F, 51.6.

What I claim is:

1. A process for replacing chlorine atoms in fluorochlorobenzenes with substituents selected from the group consisting of hydroxyl, amino and alkylamino comprising heating a fluorochlorobenzene with a substance chosen respectively from the group consisting of water, ammonia, methylamine or ethylamine in the presence of a copper compound selected from cuprous chloride, cupric chloride or cuprous oxide at a temperature of 150° C. to 400° C.

2. A process for making pentafluoroaniline, $C_6F_5NH_2$, comprising heating pentafluorochlorobenzene with aqueous ammonia in the presence of cuprous chloride in a closed vessel at a temperature of 200° C. to 220° C.

3. A process for making pentafluoromonoethylaniline, $C_6F_5.NHC_2H_5$, comprising heating pentafluorochlorobenzene with aqueous ethylamine in the presence of cuprous chloride in a closed vessel at a temperature of 190° C. to 210° C.

4. A process for making pentafluorophenol, $C_6F_5OH$, comprising heating pentafluorochlorobenzene with water in the presence of cuprous oxide in a closed vessel at a temperature of 370° C. to 390° C.

References Cited

UNITED STATES PATENTS 2,829,164    4/1958    Rocklin _____ 260—577 X

OTHER REFERENCES

Bergstrom et al.: Journal Organic Chemistry, vol. 1, pps. 170–8 (1937).

CHARLES B. PARKER, *Primary Examiner.*

R. V. HINES, *Assistant Examiner.*